(12) United States Patent
McGeer et al.

(10) Patent No.: US 7,165,745 B2
(45) Date of Patent: Jan. 23, 2007

(54) METHODS AND APPARATUSES FOR LAUNCHING UNMANNED AIRCRAFT, INCLUDING RELEASABLY GRIPPING AIRCRAFT DURING LAUNCH AND BRAKING SUBSEQUENT GRIP MOTION

(75) Inventors: Brian T. McGeer, Underwood, WA (US); Andreas H. von Flotow, Hood River, OR (US); Cory Roeseler, Hood River, OR (US)

(73) Assignee: The Insitu Group, Inc., Bingen, WA (US)

( * ) Notice: Subject to any disclaimer, the term of this patent is extended or adjusted under 35 U.S.C. 154(b) by 75 days.

(21) Appl. No.: 10/808,725

(22) Filed: Mar. 24, 2004

(65) Prior Publication Data

US 2005/0178895 A1 Aug. 18, 2005

Related U.S. Application Data

(63) Continuation-in-part of application No. 10/758,955, filed on Jan. 16, 2004.

(60) Provisional application No. 60/554,824, filed on Mar. 19, 2004, provisional application No. 60/440,727, filed on Jan. 17, 2003.

(51) Int. Cl.
 *B64F 1/06* (2006.01)
(52) U.S. Cl. .................................... 244/63; 244/114 R
(58) Field of Classification Search .................. 244/63, 244/114 R; 89/1.8–1.82; 446/63–65
 See application file for complete search history.

(56) References Cited

U.S. PATENT DOCUMENTS

| 965,881 A | 8/1910 | Draper |
|---|---|---|
| 968,339 A | 8/1910 | Geraldson |
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |

(Continued)

FOREIGN PATENT DOCUMENTS

DE   4301671 A1   7/1993

(Continued)

OTHER PUBLICATIONS

U.S. Appl. No. 10/758,940, Dennis.

(Continued)

*Primary Examiner*—Timothy D. Collins
(74) *Attorney, Agent, or Firm*—Perkins Coie LLP

(57) ABSTRACT

Methods and apparatuses for launching unmanned aircraft and other flight devices or projectiles are described. In one embodiment, the aircraft can be launched from an apparatus that includes a launch carriage that moves along a launch guide. The carriage can accelerate when portions of the carriage and/or the launch guide move relative to each other. A gripper carried by the launch carriage can have at least one grip portion in contact with the aircraft while the launch carriage accelerates along the launch axis. The at least one grip portion can move out of contact with the aircraft as the launch carriage decelerates, releasing the aircraft for takeoff. A brake can arrest the motion of the gripper after launch.

13 Claims, 9 Drawing Sheets

U.S. PATENT DOCUMENTS

| | | |
|---|---|---|
| 1,499,472 A | 7/1924 | Hazen |
| 1,530,010 A | 3/1925 | Neilson |
| 1,556,348 A | 10/1925 | Ray et al. |
| 1,624,188 A | 4/1927 | Simon |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,756,747 A | 4/1930 | Holland |
| 1,777,167 A | 9/1930 | Forbes |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,333,559 A | 11/1943 | Grady et al. |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,435,197 A | 2/1948 | Brodie |
| 2,436,240 A | 2/1948 | Wiertz |
| 2,448,209 A | 8/1948 | Boyer et al. |
| 2,465,936 A | 3/1949 | Schultz |
| 2,488,050 A | 11/1949 | Brodie |
| 2,515,205 A | 7/1950 | Fieux |
| 2,526,348 A | 10/1950 | Gouge |
| 2,669,403 A | 2/1954 | Milligan |
| 2,735,391 A | 2/1956 | Buschers |
| 2,814,453 A | 11/1957 | Trimble et al. |
| 2,843,342 A | 7/1958 | Ward |
| 2,844,340 A | 7/1958 | Daniels et al. |
| 2,908,240 A | 10/1959 | Hodge |
| 2,919,871 A | 1/1960 | Sorensen |
| 2,933,183 A | 4/1960 | Koetsch |
| 3,069,118 A | 12/1962 | Bernard |
| RE25,406 E | 6/1963 | Byrne et al. |
| 3,163,380 A | 12/1964 | Brodie |
| 3,268,090 A | 8/1966 | Wirkkala |
| 3,454,244 A | 7/1969 | Walander |
| 3,468,500 A | 9/1969 | Carlsson |
| 3,484,061 A | 12/1969 | Niemkiewicz |
| 3,516,616 A | 6/1970 | Strance et al. |
| 3,684,219 A | 8/1972 | King |
| 3,708,200 A | 1/1973 | Richards |
| 3,765,625 A | 10/1973 | Myhr et al. |
| 3,827,660 A | 8/1974 | Doolittle |
| 3,939,988 A | 2/1976 | Wellman |
| 3,943,657 A | 3/1976 | Leckie |
| 3,980,259 A | 9/1976 | Greenhalgh et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| D256,816 S | 9/1980 | McMahon et al. |
| 4,236,686 A | 12/1980 | Barthelme et al. |
| 4,238,093 A | 12/1980 | Siegel et al. |
| 4,279,195 A | 7/1981 | Miller |
| 4,311,290 A | 1/1982 | Koper |
| 4,408,737 A | 10/1983 | Schwaerzler |
| 4,471,923 A | 9/1984 | Hoppner et al. |
| 4,523,729 A | 6/1985 | Frick |
| 4,566,658 A | 1/1986 | DiGiovanniantonio et al. |
| 4,678,143 A | 7/1987 | Griffin |
| 4,730,793 A | 3/1988 | Thurber, Jr. et al. |
| 4,753,400 A | 6/1988 | Reuter et al. |
| 4,809,933 A | 3/1989 | Buzby et al. |
| 4,842,222 A | 6/1989 | Baird |
| 4,909,458 A | 3/1990 | Martin |
| 4,979,701 A | 12/1990 | Colarik et al. |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,109,788 A | 5/1992 | Heinzmann |
| 5,119,935 A | 6/1992 | Stump et al. |
| 5,253,605 A | 10/1993 | Collins |
| 5,253,606 A | 10/1993 | Ortelli |
| 5,509,624 A | 4/1996 | Takahashi |
| 5,583,311 A | 12/1996 | Rieger |
| 5,655,944 A | 8/1997 | Fusselman |
| 5,687,930 A | 11/1997 | Wagner et al. |
| 5,906,336 A | 5/1999 | Eckstein |
| 6,264,140 B1 | 7/2001 | McGeer et al. |
| 6,457,673 B1 | 10/2002 | Miller |
| 6,478,650 B1 | 11/2002 | Tsai |
| 2002/0100838 A1 | 8/2002 | McGeer et al. |
| 2003/0222173 A1 | 12/2003 | McGeer et al. |
| 2005/0133665 A1 | 6/2005 | Dennis et al. |

FOREIGN PATENT DOCUMENTS

| | | | |
|---|---|---|---|
| FR | 854371 | | 4/1940 |
| GB | 2 080 216 A | | 2/1982 |
| GB | 2 150 895 A | | 7/1985 |
| GB | 2150895 A | * | 7/1985 |
| GB | 2 219 777 A | | 12/1989 |
| JP | 07-304498 | | 11/1995 |
| WO | WO 00/75014 A1 | | 12/2000 |
| WO | WO 01/07318 A1 | | 2/2001 |

OTHER PUBLICATIONS

U.S. Appl. No. 10/758,943, Dennis et al.
U.S. Appl. No. 10/758,948, Dennis et al.
U.S. Appl. No. 10/758,955, McGeer et al.
U.S. Appl. No. 10/758,956, Dennis et al.
U.S. Appl. No. 10/759,541, McGeer.
U.S. Appl. No. 10/759,545, Dennis et al.
U.S. Appl. No. 10/759,742, Dennis.
U.S. Appl. No. 10/760,150, Roeseler et al.
U.S. Appl. No. 10/813,906, Roeseler.
Robinson, Russell Norman, "Dynamic Analysis of a Carousel Remotely Piloted Vehicle Recovery System," master's thesis, Naval Post-Graduate School, Monterey, California, Dec. 1977, Thesis No. ADA52401.
Dickard, H. E. "Mini-RPV Recovery System Conceptual Study," final report, U.S. Army Air Mobility Research and Development Laboratory, Fort Eustis, Virgina, Aug. 1977, Contract DAAJ02-76-C-0048, Report No. USAAMRDL-TR-77-24.
Whitmore, Stephen A. et al., "Development of a Closed-Loop Strap Down Attitude System for an Ultrahigh Altitude Flight Experiment," technical memorandum, NASA Dryden Flight Research Center, Edwards, California, Jan. 1997, Report No. NASA TM-4775.
"Ames Builds Advanced Yawed-Wing RPV," Aviation Week and Space Technology, Jan. 22, 1973, p. 73.

* cited by examiner

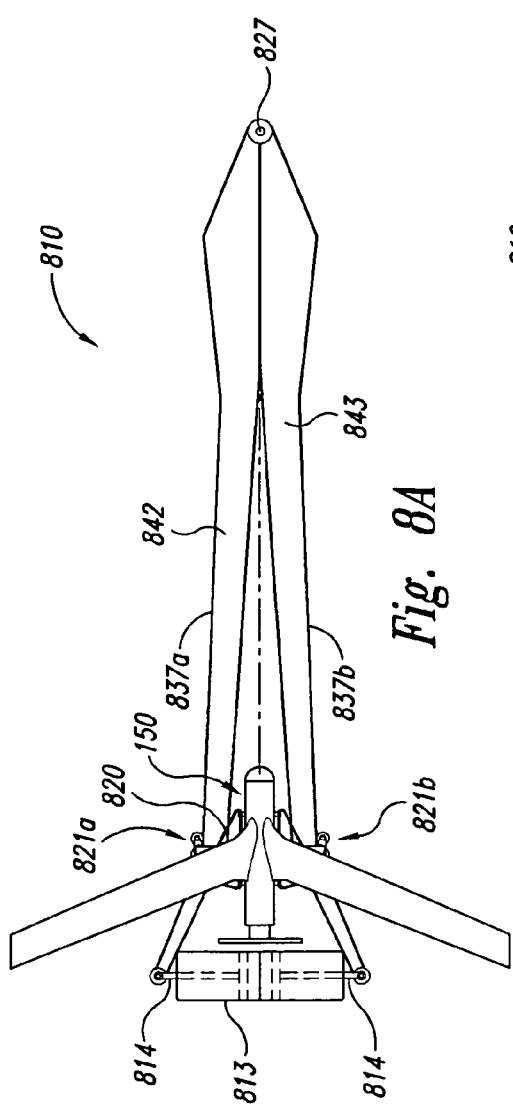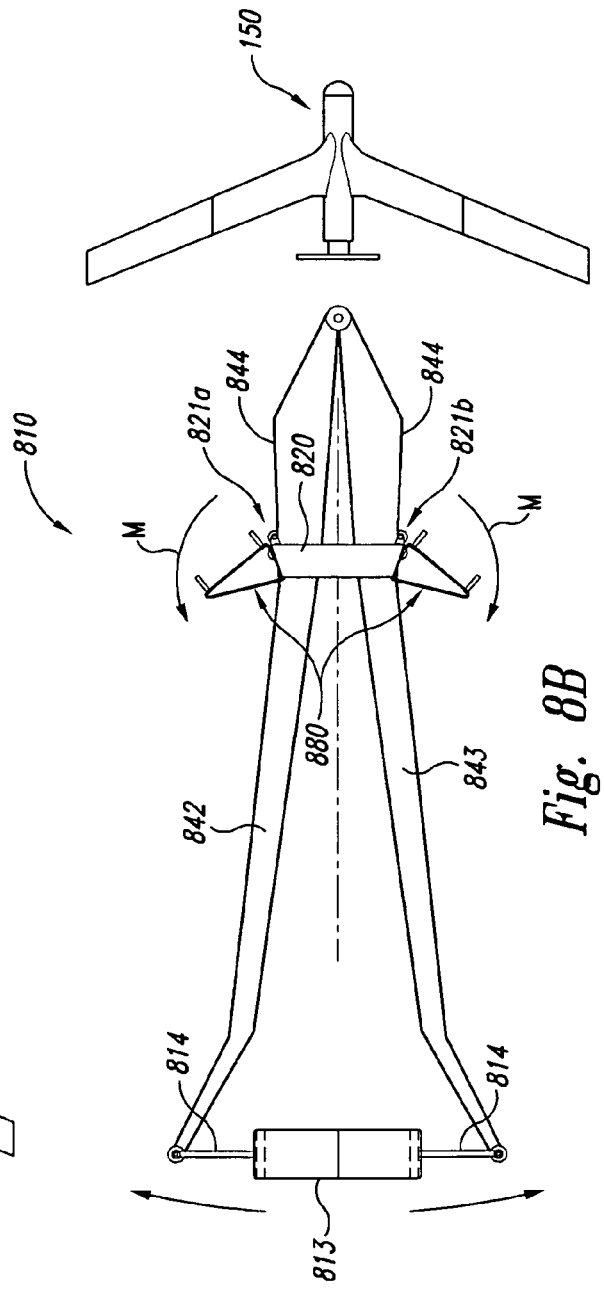

METHODS AND APPARATUSES FOR LAUNCHING UNMANNED AIRCRAFT, INCLUDING RELEASABLY GRIPPING AIRCRAFT DURING LAUNCH AND BRAKING SUBSEQUENT GRIP MOTION

CROSS-REFERENCE TO RELATED APPLICATIONS

The present application is a continuation-in-part of U.S. application Ser. No. 10/758,955, entitled "Methods and Apparatuses for Launching Unmanned Aircraft, Including Methods and Apparatuses for Releasably Gripping Aircraft During Launch," filed Jan. 16, 2004 and incorporated herein in its entirety by reference, and which claims priority to U.S. Provisional Application Ser. No. 60/440,727, entitled "Methods and Apparatuses for Launching Unmanned Aircraft. Including Methods and Apparatuses for Releasably Gripping Aircraft During Launch," filed Jan. 17, 2003. This application also claims priority to pending U.S. Provisional Application No. 60/554,824, entitled "Methods and Systems for Accelerating Aircraft for Launch," filed Mar. 19, 2004 and incorporated herein in its entirety by reference.

TECHNICAL FIELD

The present disclosure describes methods and apparatuses for launching unmanned aircraft, including methods and apparatuses for releasably gripping aircraft during launch and braking subsequent grip motion.

BACKGROUND

Unmanned aircraft or air vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage devices) typically require substantial space. Accordingly, these systems can be difficult to install and operate in cramped quarters, such as the deck of a small fishing boat, land vehicle, or other craft. Another drawback with some existing unmanned aircraft is that, due to small size and low weight, they can be subjected to higher acceleration and deceleration forces than are larger, manned air vehicles, and can accordingly be prone to damage. Still another drawback with existing launch devices is that they may not absorb the energy associated with a launch in a manner that effectively prevents or limits loads placed on the launch device and/or the aircraft, exposing the launch device and the aircraft to damage.

SUMMARY

The present invention is directed generally toward methods and apparatuses for launching unmanned aircraft. An apparatus in accordance with one aspect of the invention includes a support, a launch carriage movably carried by the support, and a gripper movably coupled to the launch carriage. The gripper can include at least one grip portion positioned to releasably engage an unmanned aircraft. The gripper can be movable relative to the launch carriage between a first position with the at least one grip portion positioned to contact the aircraft, and a second position with the at least one grip portion positioned to be out of contact with the aircraft. A brake can be positioned at least proximate to the gripper and can be changeable from a first configuration in which the brake inhibits motion of the gripper by a first amount, and a second configuration in which the brake does not inhibit motion of the gripper, or inhibits motion of the gripper by a second amount less than the first amount. Accordingly, the brake can control the motion of the gripper after the aircraft has been released.

An apparatus in accordance with another aspect of the invention includes a first launch member, a second launch member positioned at least proximate to the first launch member, and a launch carriage having support positioned to releasably carry an unmanned aircraft during a takeoff operation. The launch carriage can include a first portion in contact with the first launch member and a second portion in contact with the second launch member. The launch carriage can be movable relative to the launch members between a first launch carriage location and a second launch carriage location as at least one of the first and second launch members moves relative to the other, or at least one of the carriage portions moves relative to the other, or both.

A method in accordance with a further aspect of the invention includes releasably supporting an unmanned aircraft with a launch carriage, releasably engaging the aircraft with a gripper carried by the launch carriage and accelerating the launch carriage along a launch axis. The method can further include disengaging the gripper from the aircraft by moving the gripper relative to the launch carriage from a first position to a second position, releasing the aircraft from the launch carriage for flight, and at least restricting motion of the gripper relative to the launch carriage after disengaging the gripper.

A method in accordance with another aspect of the invention includes releasably supporting an unmanned aircraft with a launch carriage that is movably carried by and in contact with a first launch member and a second launch member. The launch carriage can be accelerated from a first launch carriage location to a second launch carriage location by moving at least one of the first and second launch members relative to the other while the launch members contact the launch carriage, or by moving at least one portion of the launch carriage relative to the other while the launch members contact the launch carriage, or both. The method can further include releasing the unmanned aircraft from the launch carriage for flight.

BRIEF DESCRIPTION OF THE DRAWINGS

FIGS. 8A–8B are partially schematic illustrations of an apparatus having a movable launch member for launching an unmanned aircraft in accordance with another embodiment of the invention.

DETAILED DESCRIPTION

The following disclosure describes systems and methods for launching aircraft, for example, unmanned aerial vehicles (UAVs). Certain specific details are set forth in the following description and in FIGS. 1A–8B to provide a thorough understanding of various embodiments of the invention. Well-known structures, systems and methods often associated with aircraft launch systems have not been shown or described in detail below to avoid unnecessarily obscuring the description of the various embodiments of the invention. In addition, those of ordinary skill in the relevant art will understand that additional embodiments of the present invention may be practiced without several of the details described below.

Figure 1A:
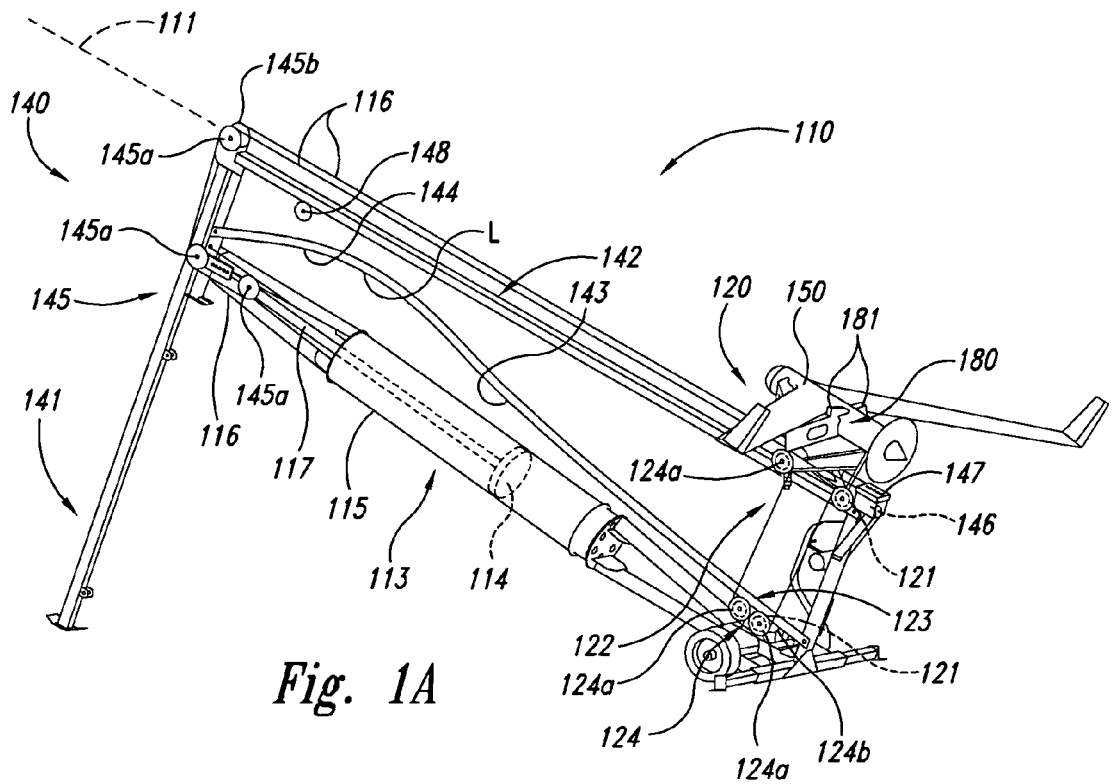
FIGS. 1A–1C illustrate an arrangement for launching an unmanned aircraft in accordance with an embodiment of the invention.

FIG. 1A illustrates a launch system 110 having a launch guide 140 and a carriage 120 that together accelerate and guide an aircraft 150 along an initial flight path 111 at the outset of a flight. The launch guide 140 can include a support structure 141 carrying a first or upper launch member 142 (e.g., a track) and a second or lower launch member 143, both of which are generally aligned with the initial flight path 111. The support structure 141 can be mounted to a vehicle (e.g., a trailer or a boat) or to a fixed platform (e.g., a building). Portions of the first launch member 142 and the second launch member 143 can be non-parallel to each other (e.g., they can converge in a direction aligned with the initial flight path 111) to accelerate the carriage 120, as described below.

The carriage 120 can include a gripper 180 having a pair of gripper arms 181 that releasably carry the aircraft 150. The carriage 120 can also include a first or upper portion 122 and a second or lower portion 123, each of which has rollers 121 (shown in hidden lines in FIG. 1A). The rollers 121 can guide the carriage 120 along the launch members 142, 143 while the carriage portions 122, 123 are driven toward each other. Accordingly, normal forces applied to the rollers 121 can drive the rollers 121 against the launch members 142, 143, drive the carriage portions 122, 123 together, and drive the carriage 120 forward, thereby accelerating the aircraft 150 to flight speed.

An actuator 113 can be linked to the carriage 120 to provide the squeezing force that drives the carriage portions 122, 123 toward each other and drives the carriage 120 along the launch guide 140. Many actuators 113 that are configured to release energy fast enough to launch the aircraft 150 also have a spring-like behavior. Accordingly, the actuators 113 tend to exert large forces at the beginning of a power stroke and smaller forces as the power stroke progresses and the carriage 120 moves along the launch guide 140. An embodiment of the system 110 shown in FIG. 1A can compensate for this spring-like behavior by having a relative angle between the first launch member 142 and the second launch member 143 that becomes progressively steeper in the launch direction. In one example, the force provided by the actuator 113 can decrease from 6000 lbs to 3000 lbs as the carriage 120 accelerates. Over the same distance, the relative slope between the first launch member 142 and the second launch member 143 can change from 6:1 to 3:1. Accordingly, the resulting thrust imparted to the carriage 120 and the aircraft 150 can remain at least approximately constant.

At or near a launch point L, the carriage 120 reaches the launch speed of the aircraft 150. The first launch member 142 and the second launch member 143 can diverge (instead of converge) forward of the launch point L to form a braking ramp 144. At the braking ramp 144, the carriage 120 rapidly decelerates to release the aircraft 150. The carriage 120 then stops and returns to a rest position at least proximate to or coincident with the launch position L.

In one embodiment, the actuator 113 includes a piston 114 that moves within a cylinder 115. The piston 114 is attached to a flexible, elongated transmission element 116 (e.g., a rope or cable) via a piston rod 117. The transmission element 116 can pass through a series of guide pulleys 145 (carried by the launch guide 140) and carriage pulleys 124 (carried by the carriage 120). The guide pulleys 145 can include first guide pulleys 145a on a first side of the support structure 141, and corresponding second guide pulleys 145b on a second (opposite) side of the support structure 141. The carriage pulleys 124 can also include first carriage pulleys 124a on a first side of the carriage 120 and second pulleys 124b on a second (opposite) side of the carriage 120. One or more equalizing pulleys 146, located in a housing 147 can be positioned between (a) the first guide pulleys 145a and the first carriage pulleys 124a on the first side of the support structure 141, and (b) the second guide pulleys 145b and the second carriage pulleys 124b on the second side of the support structure 141.

In operation, one end of the transmission element 116 can be attached to the first side of the support structure 141, laced through the first pulleys 145a, 124a, around the equalizing pulley(s) 146, and then through the second pulleys 145b, 124b. The opposite end of the transmission element 116 can be attached to the second side of the support structure 141. The equalizing pulley(s) 146 can (a) guide the transmission element 116 from the first side of the support structure 141 to the second side of the support structure 141, and (b) equalize the tension in the transmission element 116 on the first side of the support structure 141 with that on the second side of the support structure 141.

When the transmission element 116 is tensioned, it squeezes the carriage portions 122, 123 together, forcing the carriage 120 along the converging launch members 142, 143. The carriage pulleys 124 and the rollers 121 (which can be coaxial with the carriage pulleys 124) are secured to the carriage 120 so that the carriage 120 rides freely along the initial flight path 111 of the aircraft 150 as the carriage portions 122, 123 move together.

Figure 1B:
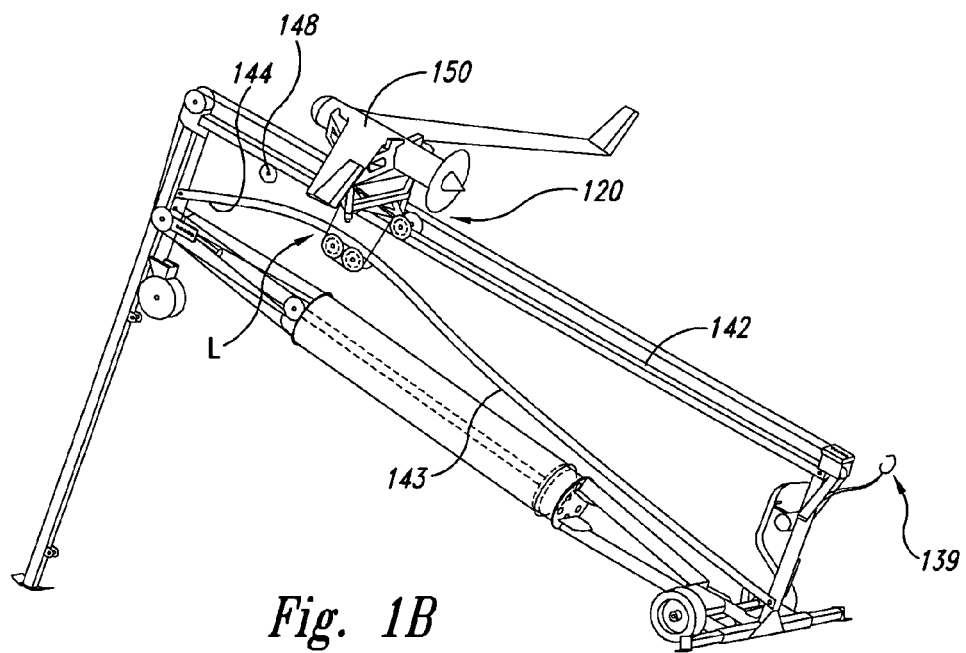

FIG. 1B illustrates the launch of the carriage 120 in accordance with an embodiment of the invention. The carriage 120 is held in place prior to launch by a trigger device 139, e.g., a restraining shackle. When the trigger device 139 is released, the carriage 120 accelerates along the launch members 142, 143, moving from a first launch carriage location to a second launch carriage location (e.g., to the launch point L). At the launch point L, the carriage 120 achieves its maximum velocity and begins to decelerate by rolling along the braking ramp 144. In this embodiment, one or more arresting pulleys 148 can be positioned along the braking ramp 144 to intercept the transmission element 116 and further decelerate the carriage 120.

Figure 1C:
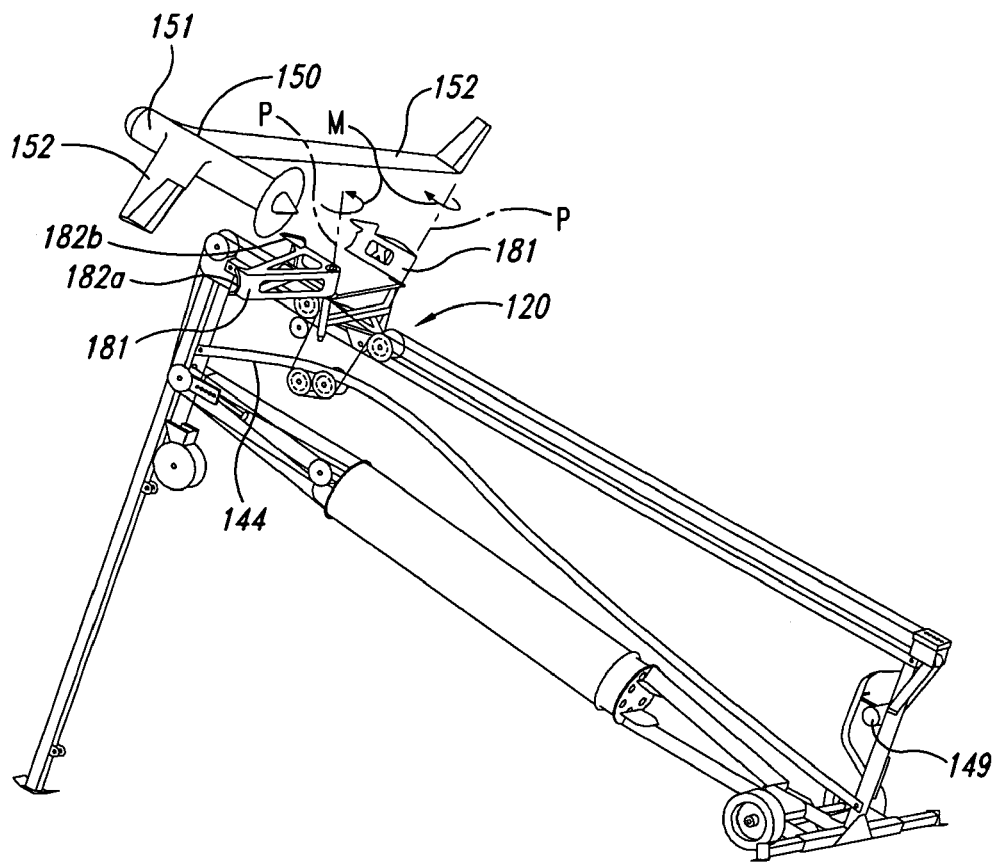

As shown in FIG. 1C, once the carriage 120 begins to decelerate along the braking ramp 144, the aircraft 150 is released by the gripper arms 181. Each gripper arm 181 can include a forward contact portion 182a and an aft contact portion 182b configured to releasably engage a fuselage 151 of the aircraft 150. Accordingly, each contact portion 182 can have a curved shape so as to conform to the curved shape of the fuselage 151. In other embodiments, the gripper arms 181 can engage different portions of the aircraft 150 (e.g., the wings 152). Each gripper arm 181 can be pivotably coupled to the carriage 120 to rotate about a pivot axis P. The gripper arms 181 can pivot about the pivot axes P to slightly over-center positions when engaged with the aircraft 150. Accordingly, the gripper arms 181 can securely grip the fuselage 151 and resist ambient windloads, gravity, propeller thrust (e.g., the maximum thrust provided to the aircraft 150), and other external transitory loads as the carriage 120 accelerates. In one aspect of this embodiment, each pivot axis P is canted outwardly away from the vertical. As described in greater detail below, this arrangement can prevent interference between the gripper arms 181 and the aircraft 150 as the aircraft 150 is launched.

At least a portion of the mass of the gripper arms 181 can be eccentric relative to the first axis P. As a result, when the carriage 120 decelerates, the forward momentum of the gripper arms 181 causes them to fling open by pivoting about the pivot axis P, as indicated by arrows M. The forward momentum of the gripper arms 181 can accordingly overcome the over-center action described above. As the gripper arms 181 begin to open, the contact portions 1824a, 1824b begin to disengage from the aircraft 150. In a particular aspect of this embodiment, the gripper arms 181 pivot downwardly and away from the aircraft 150.

An advantage of a gripper arrangement described above with reference to FIG. 1C is that the gripping action provided by the gripper arms 181 can be distributed fore and aft over the fuselage 151, thus distributing the gripping load. A further advantage of embodiments of the foregoing arrangement is that the gripper arms 181 can be configured to quickly and completely rotate out of the way of the aircraft 150 as the aircraft 150 takes flight. Still a further advantage of the foregoing arrangement is that no additional hardware (with associated weight and drag), need be provided to the aircraft 150 to allow it to be releasably carried by the carriage 120. In still further embodiments, the motion of the gripper arms 181 after the aircraft 150 has been released can be controlled, as described in greater detail below with reference to FIG. 6.

Figure 2:
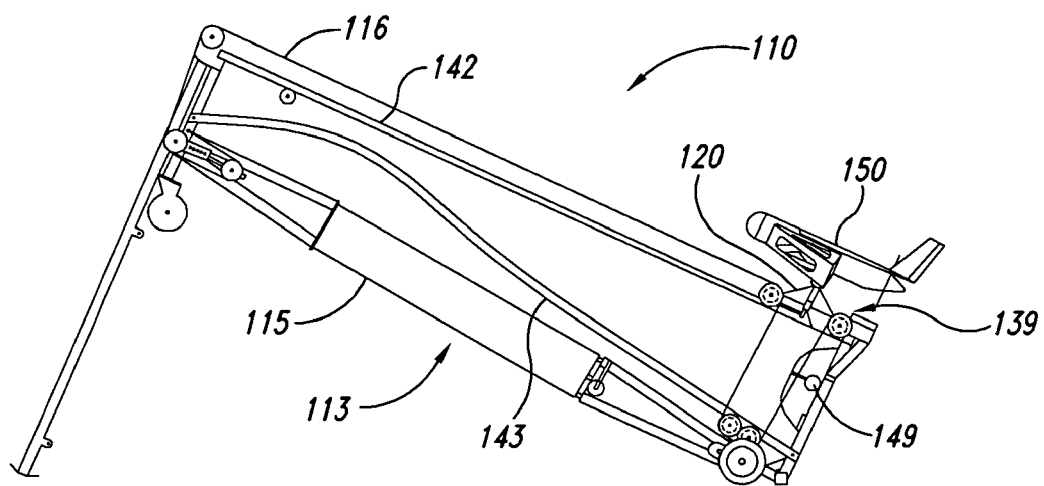
FIG. 2 illustrates an embodiment of the arrangement shown in FIGS. 1A–1C after having been reset for a subsequent launch.

After the aircraft 150 is launched, a pull-back winch 149 can be used to cock the launch system 110 (e.g., return the carriage 120 to its launch position) in preparation for the next launch. FIG. 2 illustrates the system 110 in the cocked position. A rope or strap extends from the pull-back winch 149 to the trigger device 139 which engages with the carriage 120. The actuator 113 can then be energized (e.g., by pressurizing the cylinder 115), prior to the next launch.

Figure 3:
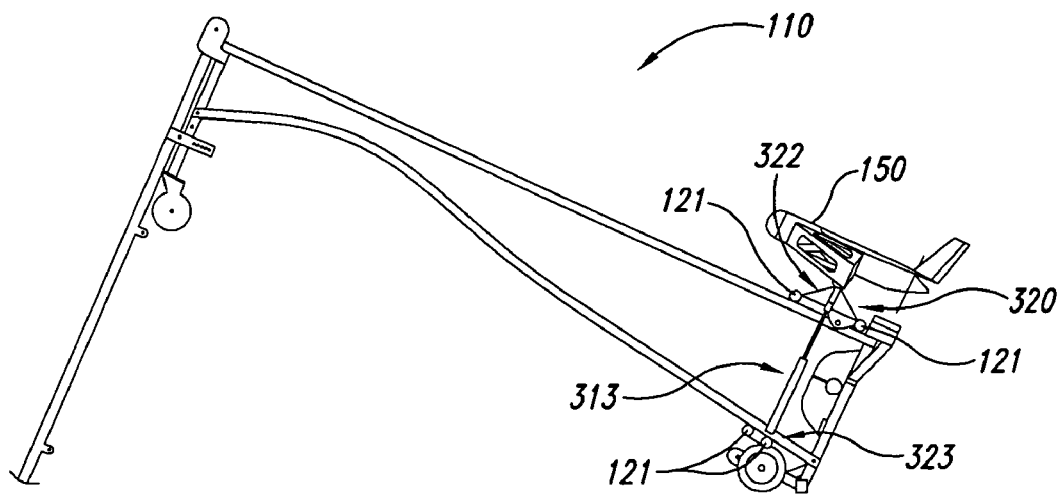
FIGS. 3 and 4 illustrate systems for launching an aircraft with a carriage that carries both the aircraft and an actuator.
Figure 4:
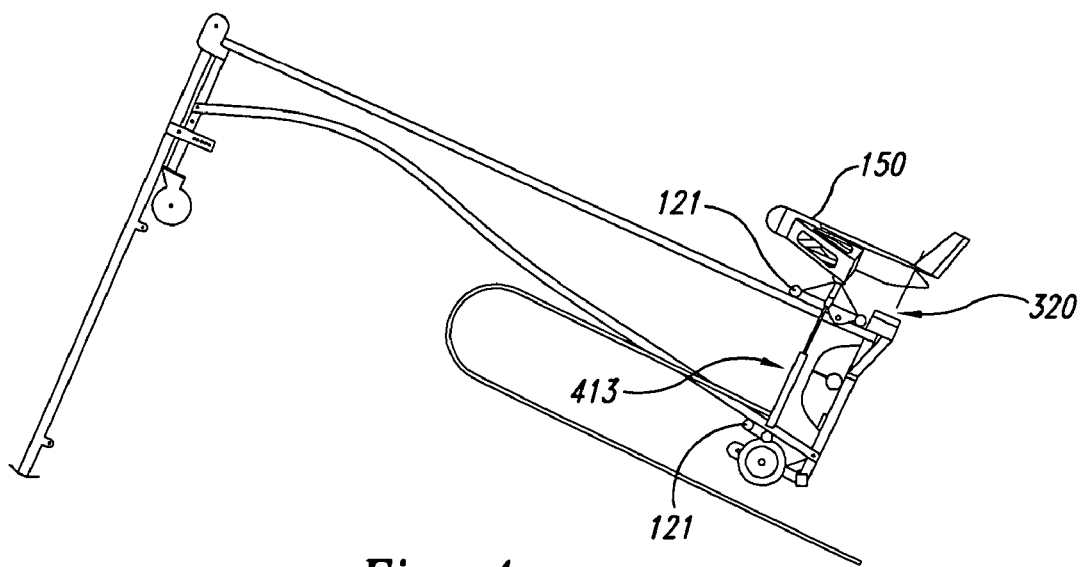

FIG. 3 illustrates a launch system 110 configured in accordance with another embodiment of the invention. In one aspect of this embodiment, the system 110 includes a carriage 320 having carriage portions 322, 323 coupled to each other with an actuator 313 that is carried by the carriage 320. As the actuator 313 contracts, it draws the two carriage portions 322, 323 toward each other which, because the launch members 142, 143 converge, causes the carriage 320 to roll forward on the rollers 121.

In one aspect of this embodiment, the actuator 313 includes a spring that links the carriage portions 322, 323.

The mass of the carriage 320 accordingly includes that of the actuator 313, and the energy requirements are correspondingly larger than that of the carriage 120 described above with reference to FIGS. 1C. On the other hand, the carriage 320 shown in FIG. 3 requires no transmission element 116 or pulleys 145, 124 (FIG. 1A).

In yet another embodiment, (shown in FIG. 4) the carriage 320 carries an actuator 413, but at least a portion of the energy required by the actuator 413 is provided to the actuator 413 from a ground-based link 418 (e.g., a hose or wire). Accordingly, in one aspect of this embodiment, the actuator 413 can include a pneumatic or hydraulic actuator. In other embodiments, the actuator 413 can include an electric linear actuator or a lead screw-actuator.

Embodiments of the present invention can include a relatively small spring (or other actuator) and no rotating cam system to achieve a constant force launch acceleration. Embodiments of the present invention can also employ a movable carriage (or shuttle), and an actuator that strokes through only a fraction of the carriage stroke. The "gain" or amplification of this motion amplifier can correspond to the slope of one launch member relative to one or more opposing launch members. For example, in one embodiment, the piston 114 described above with reference to FIG. 1A can stroke through a distance of two feet, while accelerating the carriage 120 with a constant force over a distance of ten feet.

Figure 5:
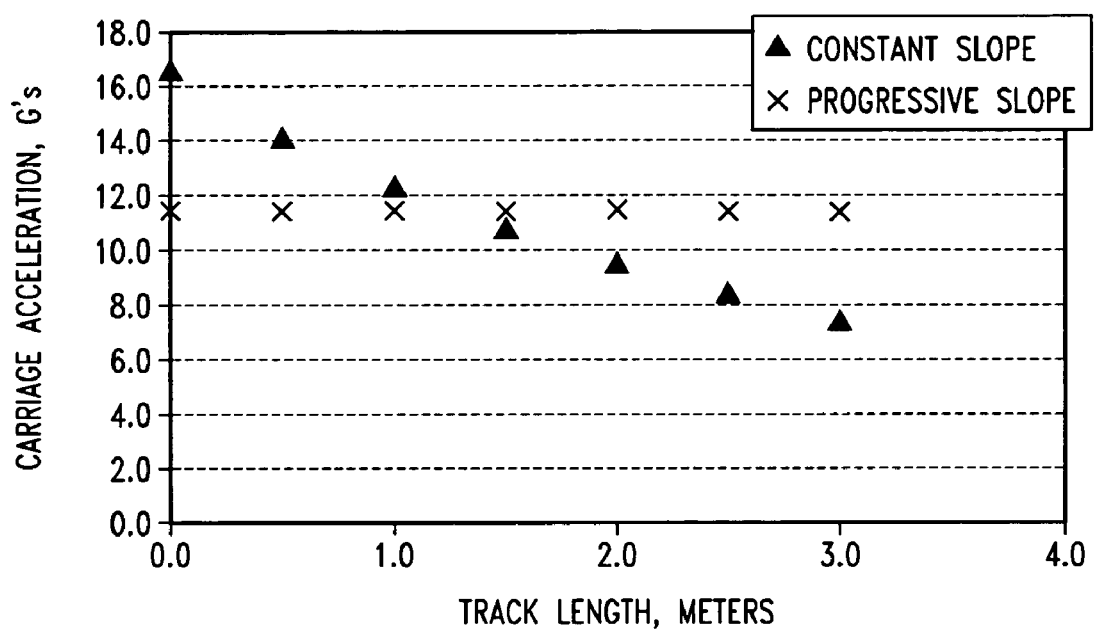
FIG. 5 illustrates a predicted carriage acceleration associated with an embodiment of the invention.

FIG. 5 illustrates a graph of predicted carriage acceleration as a function of launch member length for an existing system having a single track and a spring or spring-like actuator, along with a system having two non-parallel launch members (e.g., as shown in FIG. 1A), also with a spring-like actuator. As shown in FIG. 5, by tailoring the relative angle between the non-parallel launch members to compensate for the reduced force provided by the actuator over the length of the launch guide, the force applied to the carriage (and therefore the acceleration of the carriage) can be maintained at a constant or nearly constant level until the carriage is deliberately decelerated to launch the aircraft. An advantage of this arrangement is that it can significantly reduce the peak force applied to the aircraft without significantly increasing the energy required by the launch mechanism, or the distance required to accelerate the aircraft to launch velocity.

Figure 6:
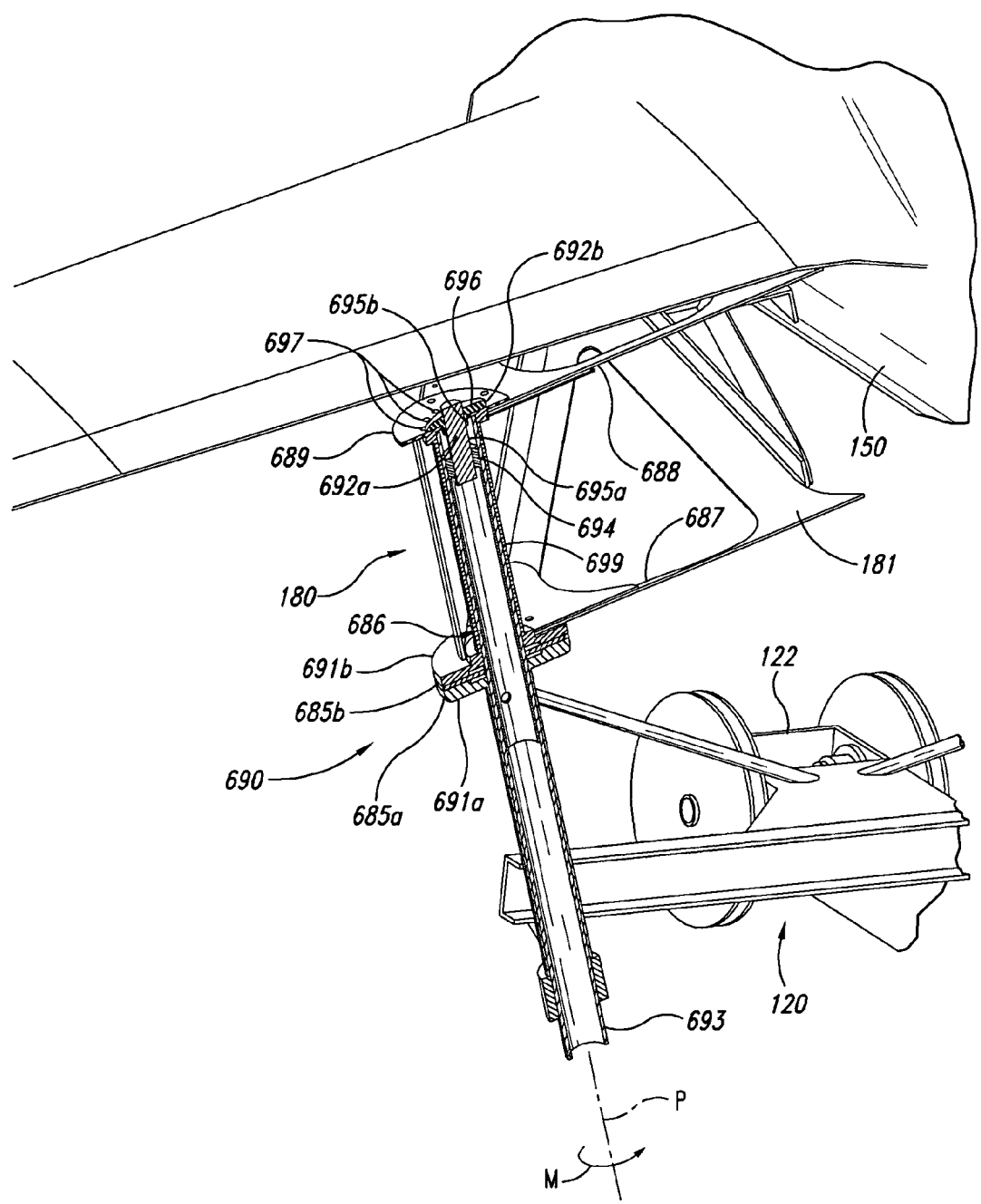
FIG. 6 is a partially cut-away illustration of a gripper and gripper brake for releasably supporting an aircraft during launch.

FIG. 6 is a partially cut-away illustration of an embodiment of the carriage 120 as the gripper 180 supports the aircraft 150 prior to release. For purposes of illustration, only one of the gripper arms 181 is shown in FIG. 6. The carriage upper portion 122 can include a pivot post 693 extending along the pivot axis P. The gripper arm 181 can include an upper portion 688 and a lower portion 687. A gripper sleeve 699 can be attached to the upper portion 688 and disposed coaxially about the pivot post 693. One or more bearings 686 can support the gripper sleeve 699 relative to the pivot post 693. Accordingly, the gripper arm 181 can rotate smoothly about the pivot axis P as indicated by arrow M.

As discussed above, the gripper arm 181 can pivot both downwardly and outwardly away from the aircraft 150 during release so as to reduce the likelihood that the gripper arm 181 will strike the aircraft 150 as the aircraft 150 takes off. To further reduce the likelihood that the gripper arm 181 will strike either the aircraft 150 or the opposing gripper arm, the system 110 can include a gripper brake 690 that arrests the rotational motion of the gripper arm 181 once the aircraft 150 has been released.

The gripper brake 690 can include a first brake member 691a that is fixed relative to the pivot post 693, and a second brake member 691*b* that is fixed to the gripper sleeve 698 to rotate with the gripper arm 181. The second brake member 691*b* can also move axially toward the first brake member 691*a* along the pivot axis P during braking. The first brake member 691*a* can include a first brake surface 685*a*, and the second brake member 691*b* can include a second brake surface 685*b*. As the second brake member 691*b* moves toward and rotates relative to the first brake member 691*a*, the brake surfaces 685*a*, 685*b* contact each other and halt the rotation of the gripper arm 181. Accordingly, the brake 690 can be changeable between a first configuration in which it inhibits motion of the gripper 181 by a first amount (e.g., after launch) and a second configuration in which it does not inhibit motion of the gripper arm 181, or inhibits motion of the gripper arm 181 by a second, lesser amount (e.g., prior to launch).

To control the motion of the second brake member 691*b* relative to the first brake member 691*a*, the gripper brake 690 can further include a first threaded member 692*a* that can be generally fixed relative to the pivot post 693 and can be supported with a first threaded member support 694. The first threaded member 692*a* can include external threads 695*a* that engage internal threads 695*b* of a second threaded member 692*b*, carried by the gripper sleeve 699. As the gripper arm 181 rotates about the pivot axis P, it rotates the second threaded member 692*b* relative to the first threaded member 692*a*. The first threaded member 692*a* and the second threaded member 692*b* can have left-hand threads, so that the second threaded member 692*b* moves axially downwardly as it rotates. This axial motion drives the second brake member 691*b* into engagement with the first brake member 691*a*. As the second threaded member 692*b* continues to rotate, it drives the second brake surface 685*b* against the first brake surface 685*a* with increasing pressure. This action stops the gripper arm 181 from rotating. A corresponding pair of threaded members on the opposite gripper arm can have right-hand threads to provide a generally similar brake action to that gripper arm.

In a particular embodiment, the position of the second brake member 691*b* relative to the first brake member 691*a* when the gripper arm 181 is in the gripping position (as shown in FIG. 6) can be adjusted so that there is at least a slight gap (or, in one embodiment, no gap, but little or no pressure) between the second brake surface 685*b* and the first brake surface 685*a*. Accordingly, the gripper sleeve 699 can include an adjustment flange 689 having multiple adjustment holes 697. The second threaded member 692*b* can include an alignment hole 696 that can be selectively aligned with any of the adjustment holes 697 as the second threaded member 692*b* is rotated independently of the gripper arm 181. Accordingly, a user can rotate the second threaded member 692*b* about the first threaded member 692*a* until a small gap exists between the second brake surface 685*b* and the first brake surface 685*a*. The user can then lock the second threaded member 692*b* relative to the gripper arm 181 by inserting a pin or other fastener through the alignment hole 696 and into a corresponding adjustment hole 697 of the adjustment flange 689. If, over the course of time, the first and second brake surfaces 685*a*, 685*b* move apart from reach other (e.g., as a result of wear), the initial gap between the brake surfaces 685*a*, 685*b* can be readjusted by simply repositioning the second threaded member 692*b* relative to the adjustment flange 689.

The materials of at least some of the system components described above can be selected to reduce and/or eliminate interference caused by differential thermal expansion of one component relative to another. For example, the first threaded member support 694, the pivot post 693, and/or the first threaded member 692*a* can be formed from the same material as the gripper arm 181. Accordingly, the position of the second brake member 691*b* relative to the first brake member 691*a* can be less likely to change as the ambient temperature changes. In other embodiments, the materials selected for these or other components can be selected to increase the life expectancy of the components. For example, the first threaded member 692*a* can be selected to include steel and the second threaded member 692*b* can be selected to include brass. In other embodiments, these components can have other material properties and/or arrangements. For example, the gripper brake 690 can brake the gripper arms 181 via an action different than the axial and rotational action described above.

A feature of an embodiment of the system described above with reference to FIG. 6 is that the gripper brake 690 can rapidly, predictably, and repeatably stop the motion of the gripper arm 181 as it pivots away from the aircraft 150 during release. An advantage of this arrangement is that the gripper arm 181 can be less likely to strike either the aircraft 150 or the opposing gripper arm (not shown in FIG. 6).

In the embodiments of the launch system 110 described above, the portions of the carriage 120 move relative to each other while the launch members 142, 143 remain fixed. In other embodiments, the launch members can move, in lieu of, or in addition to the movement of the carriage portions. FIGS. 7A–8B illustrate launch systems having moving launch members in accordance with further embodiments of the invention. Beginning with FIG. 7A, a launch system 710 in accordance with one embodiment of the invention can include a base 730 carrying two or more supports 731 (shown in FIG. 7A as a first support 731*a* and a second support 731*b*). The base 730 can be configured to incline relative to the ground (for example, with a jack 732) to orient the aircraft 150 for launch.

The launch system 710 can further include a first launch member 742 (e.g., a first track) and a second launch member 743 (e.g., a second track), both of which support a carriage 720, which in turn carries the aircraft 150 via a releasable gripper 780. At least one of the first launch member 742 and the second launch member 743 is movable relative to the other. For example, in one embodiment, the first launch member 742 can be fixed relative to the base 730, and the second launch member 743 can be movable relative to the base 730. In other embodiments, the first and second launch members 742, 743 can have different arrangements. In any of these embodiments, the movement of at least one of the first and second launch members 742, 743 can accelerate the carriage 720 to launch the aircraft 150, as described in greater detail below.

In one embodiment, the second launch member 743 can translate and/or rotate relative to the first launch member 742. In a particular aspect of this embodiment, the motion of the second launch member 743 relative to the first launch member 742 can be controlled by a pin 729, which depends from the second launch member 743 and which is received in an elongated guide slot 728 of the second support 731*b*. The motion of the second launch member 743 can be further controlled by a block and tackle 733. In one embodiment, the block and tackle 733 can include a coupling line 735 attached to the second launch member 743 at a first line attachment point 736*a*. The coupling line 735 passes through a series of pulleys 745*a*–745*e* to a second attachment point 736*b*, also on the second launch member 743. In other embodiments, the second launch member 743 can be supported relative to the first launch member 742 in other arrangements.

The carriage 720 can engage both the first launch member 742 and the second launch member 743. For example, in one embodiment, the first launch member 742 can include a first roller surface 737a (which engages first rollers or wheels 721a of the carriage 720), and the second launch member 743 can include a second roller surface 737b (which engages second rollers or wheels 721b of the carriage 720). Carriage arms or links 725 can support the second wheels 721b relative to the first wheels 721a.

Figures 7A, 7B:
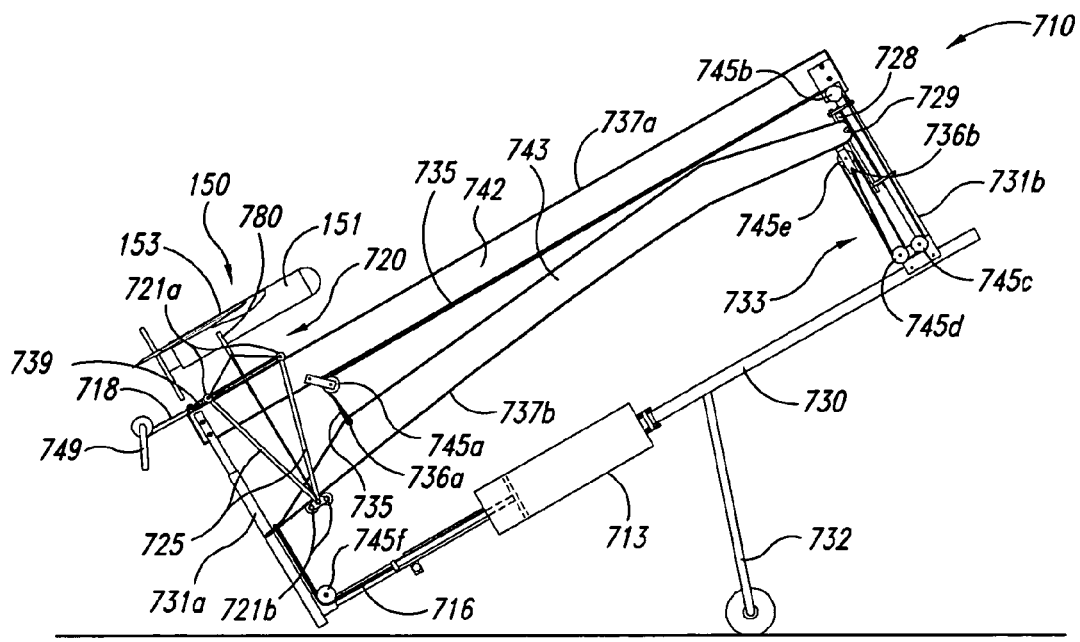
FIGS. 7A–7E are partially schematic illustrations of an apparatus having at least one movable launch member for launching an unmanned aircraft in accordance with another embodiment of the invention.

The second roller surface 737b can have a curved profile (or other shape) to control the acceleration of the carriage 720. Accordingly, the carriage 720 can travel (from left to right as shown in FIG. 7A) along the first roller surface 737a while engaging the second surface roller surface 737b. In a particular aspect of this embodiment, the second roller surface 737b an be inclined relative to the first roller surface 737a and can move in a wedge fashion, so as to force the carriage 720 from left to right to launch the aircraft 150.

The force required to move the second launch member 743 relative to the first launch member 742 can be provided by an actuator 713. The actuator 713 can be coupled with an actuator line 716 to the second launch member 743, after passing around an actuator pulley 745f. In one aspect of this embodiment, the actuator 713 can include a compressed gas cylinder, having a piston that retracts the actuator line 716 to draw the second launch member 743 downwardly away from the first launch member 742, as described in greater detail below with reference to FIG. 7B. In other embodiments, the actuator 713 can have other arrangements, including a hydraulic cylinder, a bungee, or a spring. In any of these embodiments, the actuator 713 can move the second launch member 743 relative to the first launch member 742, forcing movement of the carriage 720 from left to right.

The launch system 710 can include a carriage return crank or winch 749 having a carriage return line 718 with a releasable trigger 739 connected to the carriage 720. The launch carriage 720 is held back in a pre-launch position by the carriage return line 718 while a launch force is applied to the launch carriage 720. The releasable trigger 739 is then disengaged, allowing the launch carriage 720 to accelerate. After launch, the carriage return line 718 can be used to reset the carriage 720.

FIG. 7B illustrates the launch system 710 after the carriage 720 has been accelerated to launch the aircraft 150. In one aspect of this embodiment, the actuator 713 has rapidly drawn the second launch member 743 downwardly in a manner controlled by the block and tackle 733 and the pin 729 positioned in the slot 728. As the second launch member 743 moves downwardly relative to the first launch member 742, the carriage 720 is forced from left to right at a high rate of speed, until the second wheels 721b engage a braking portion 744 of the second roller surface 737b. Accordingly, the angle between the second roller surface 737b and the first roller surface 737a changes at the braking portion 744. At this point, the carriage 720 rapidly decelerates, while the gripper 780 releases, allowing the aircraft 150 to continue forward as it is launched into flight.

Once the actuator 713 has moved the second launch member 743, it can be effectively decoupled while an operator couples the carriage return line 718 to the launch carriage 720 and activates the carriage return crank 749 to return the carriage 720 to the position shown in FIG. 7A. For example, when the actuator 713 includes a gas powered piston, the volume of the cylinder in which the piston moves can be opened to atmospheric pressure so that the operator does not need to compress the air within the cylinder when returning the carriage 720 to the launch position. Once the carriage 720 has been returned to the position shown in FIG. 7A, the actuator 713 can be readied for the next launch, for example, by charging the cylinder in which the piston operates with a compressed gas. In other embodiments, the energy of deceleration can be used to reversibly regain energy to be used during the next launch. In still further embodiments, the actuator 713 can be recharged by the carriage return crank 749. As the carriage return crank 749 is actuated, it can force the second launch member 743 to its original position as the carriage 720 returns. This movement can also force the piston of the actuator 713 to its starting position and restore gas pressure in the actuator 713.

Figure 7C:
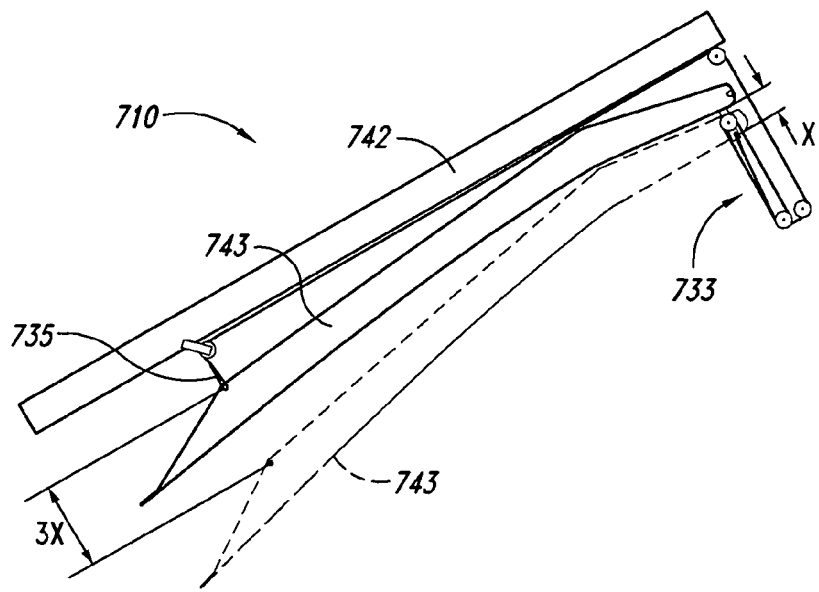

FIG. 7C is a partially schematic illustration of a portion of the launch system 710 illustrating the first launch member 742, along with the second launch member 743 (shown in its pre-launch configuration in solid lines and in its post-launch configuration in dashed lines). As shown in FIG. 7C, the portion of the second launch member 743 to which the coupling line 735 is attached can move by distance 3X, which is three times the distance X moved by the right-most portion of the second launch member 743. The wedge angle between the first launch member 742 and the second launch member 743 increases by translating and pivoting the second launch member 743 relative to the first launch member 742. By increasing the wedge angle during the launch process, the carriage 720 is accelerated at a constant or nearly constant rate, even as the force from the actuator 713 decreases near the end of the actuator's power stroke.

Figure 7D:
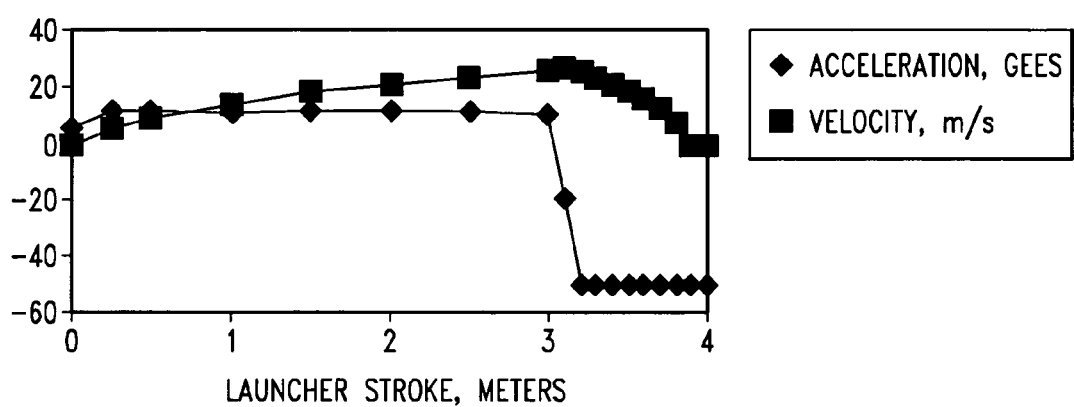

FIG. 7D is a graph illustrating predicted acceleration and velocity values for a carriage 720 propelled by a launch system 710 in accordance with an embodiment of the invention. In one aspect of this embodiment, the launch system 710 can provide a generally constant acceleration to the carriage 720, which instantaneously reverses (when the carriage 720 reaches the braking portion 744 described above). This acceleration profile can provide a generally uniform increase in velocity, as is also shown in FIG. 7D, up to at least the take-off velocity of the aircraft 150. In other embodiments, the carriage 720 can be propelled in manners that result in different acceleration and velocity profiles.

Figure 7E:
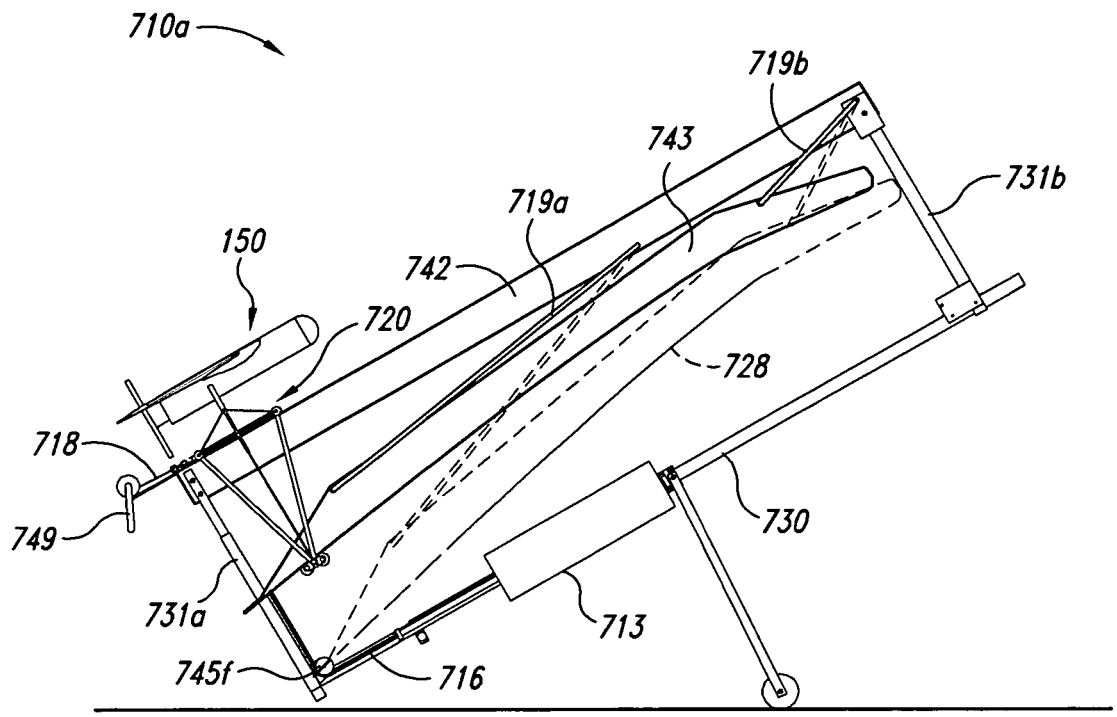

FIG. 7E is a partially schematic illustration of a launch system 710a configured in accordance with another embodiment of the invention and having many characteristics in common with the launch system 710 described above with reference to FIGS. 7A–7C. In one aspect of this embodiment, the launch system 710a includes a first link 719a and a second link 719b coupled between the first launch member 742 and the second launch member 743, in lieu of the block and tackle 733 and pin 729 described above. The motion of the second launch member 743 relative to the first launch member 742 can be generally similar to that described above with reference to FIGS. 7A and 7B, to provide acceleration and velocity profiles generally similar to those described above with reference to FIG. 7D.

FIGS. 8A–8B illustrate a launch system 810 configured in accordance with still another embodiment of the invention. In one aspect of this embodiment, the launch system 810 can include a first launch member 842 coupled to a second launch member 843 at a pivot point 827. An actuator 813 can be coupled to the first launch member 742 and the second launch member 743 with actuator rods 814 to force the first and second launch members 842, 843 apart from each other in a transverse plane. A carriage 820 can carry the aircraft 150 and can engage a first roller surface 837a of the first launch member 842 with first wheels 821a. The carriage 820 can also engage a second roller surface 837b of the second launch member 843 with second wheels 821b.

Referring now to FIG. 8B, the actuator 813 can be activated to spread the first launch member 842 and the second launch member 843 apart from each other, forcing the carriage 820 from left to right. When the carriage 820 reaches braking portions 844 of the first and second launch members 842, 843, it rapidly decelerates, causing a gripper 880 to open (as indicated by arrows M) while the aircraft 150 continues forward and is launched into flight. In other embodiments, the launch system 810 can have other arrangements.

One feature of embodiments of the launch systems described above with reference to FIG. 1A–8B is that the "wedge action" of the first and second members relative to each other can rapidly accelerate the carriage (and therefore the aircraft 150) in a relatively short distance. An advantage of this arrangement is that the launch systems can be used in cramped quarters, including the deck of a fishing vessel or a towed trailer.

Another feature of embodiments of the launch systems described above is that the wedge angle between the first and second members can increase as a function of distance (e.g., as shown in FIGS. 1A–5) and/or time (e.g., as shown in FIGS. 7A–8B). This arrangement can provide a constant or nearly constant acceleration to the carriage (and the aircraft 150), even if the force provided by the actuator decreases near the end of the actuator's power stroke. An advantage of this arrangement is that the aircraft 150 is less likely to be subject to sudden changes in acceleration, which can damage the aircraft 150.

Yet another feature of the launch systems described above with reference to FIGS. 7A–8B is that they can include a braking portion that rapidly and safely decelerates the carriage carried by the launch system. An advantage of this feature is that the system length required for deceleration can be short relative to that required for acceleration, and the overall length of the system can be correspondingly limited.

Another feature of embodiments of the launch systems described above is that the number of components that move at high speed during the launch process is relatively small. For example, in a particular embodiment (e.g., as shown in FIGS. 7A–8B), the only rolling elements that are traveling at high speed are the carriage wheels, and no high speed pulleys are included. Accordingly, the potential losses associated with components moving at high speed, including losses caused by ropes attached to the carriage suddenly accelerating and decelerating (e.g., "rope slurping") can be reduced and/or eliminated.

From the foregoing, it will be appreciated that specific embodiments of the invention have been described herein for purposes of illustration, but that various modifications may be made without deviating from the spirit and scope of the invention. For example, the systems described above can be used to launch aircraft having arrangements different than those described above. In other embodiments, these systems can handle projectiles or other airborne devices. Aspects of the systems described in the context of particular embodiments can be combined or eliminated in other embodiments. For example, the system described above with reference to FIG. 1A can be arranged transversely, as described above with reference to FIGS. 8A–8B. The gripper brake can also have arrangements different than those described above. Further details of related systems and methods are described in the following co-pending U.S. application Ser. No. 10/760,150 entitled "Methods and Apparatuses for Launching Unmanned Aircraft, Including Methods and Apparatuses for Launching Aircraft with a Wedge Action," filed Jan. 16, 2004 and incorporated herein in its entirety by reference. Accordingly, the invention is not limited except as by the appended claims.

We claim:

1. An apparatus for carrying an unmanned aircraft, comprising:
    a support;
    a launch carriage movably carried by the support;
    a gripper movably coupled to the launch carriage, the gripper positioned to releasably engage an unmanned aircraft, the gripper being movable relative to the launch carriage between a first position with the gripper portion positioned to contact the aircraft and a second position with the gripper positioned to be out of contact with the aircraft; and
    a brake positioned at least proximate to the gripper, the brake being changeable from a first configuration in which the brake inhibits motion of the gripper relative to the launch carriage by a first amount, and a second configuration in which the brake does not inhibit motion of the gripper relative to the launch carriage, or inhibits motion of the gripper by a second amount less than the first amount.

2. The apparatus of claim 1 wherein the brake includes a first brake member and a second brake member, with at least one of the brake members being movable relative to the other.

3. The apparatus of claim 1 wherein the brake includes a first brake member coupled to the carriage and a second brake member coupled to the gripper, and wherein the second brake member is rotatable about an axis and translatable along the axis between a first position relative to the first brake member and a second position relative to the first brake member.

4. The apparatus of claim 1 wherein the gripper is positioned to releasably engage a fuselage of the aircraft, the gripper being movable relative to the launch carriage between a first position with the at least one grip portion positioned to contact the fuselage and a second position with the at least one grip portion positioned to be out of contact with the fuselage.

5. The apparatus of claim 1 wherein the gripper includes two gripper arms pivotally coupled to the launch carriage, the individual gripper arms including at least one grip portion positioned to releasably engage the fuselage of the aircraft.

6. The apparatus of claim 1 wherein the gripper is movable between the first and second position when the launch carriage decelerates relative to the support.

7. The apparatus of claim 1 wherein:
    the launch carriage is movable relative to the support along a launch axis; and
    the gripper is pivotable relative to the launch carriage about a pivot axis offset from the launch axis to pivot downwardly and outwardly away from the launch axis as the gripper moves from the first position to the second position, and wherein at least a portion of the mass of the gripper is eccentrically offset from the pivot axis to swing the gripper from the first position to the second position as the carriage decelerates.

8. The apparatus of claim 1, further comprising the aircraft.

9. The apparatus of claim 1 wherein the support includes a launch guide structure having a launch axis, and wherein the launch carriage is movable relative to the support along the launch axis.

10. An apparatus for carrying an unmanned aircraft, comprising:
- a support;
- a launch carriage movably carried by the support;
- a gripper movably coupled to the launch carriage, the gripper including positioned to releasably engage an unmanned aircraft, the gripper being movable relative to the launch carriage between a first gripper position with a positioned to contact the aircraft and a second gripper position with the positioned to be out of contact with the aircraft; and
- a gripper brake positioned proximate to the gripper, the gripper brake including a first brake portion carried by the launch carriage and a second brake portion carried by the gripper, the second brake portion being movable relative to the first brake portion between a first brake position and a second brake position, with the second brake portion in contact with the first brake portion and applying a first force to the first brake portion when in the first position, and with the second brake portion out of contact with the first brake portion or applying a second force less than the first force when in the second position.

11. The system of claim 10 wherein the first brake portion is configured to rotate about an axis and translate along the axis between the first and second positions.

12. The system of claim 10 wherein the first brake portion is coupled to a first threaded member and the second brake portion is coupled to a second threaded member that is threadably engaged with the first threaded member.

13. The system of claim 10 wherein the first brake portion is coupled to a first threaded member and the second brake portion is coupled to a second threaded member that is threadably engaged with the first threaded member, and wherein the second threaded member is movable relative to the gripper to adjust an axial separation between the first and second brake portions.

* * * * *

UNITED STATES PATENT AND TRADEMARK OFFICE
CERTIFICATE OF CORRECTION

PATENT NO. : 7,165,745 B2
APPLICATION NO. : 10/808725
DATED : January 23, 2007
INVENTOR(S) : McGeer et al.

It is certified that error appears in the above-identified patent and that said Letters Patent is hereby corrected as shown below:

<u>Title Page, Page 2</u>
References Cited, Line 46, "Koetsch" should be --Koelsch--;

Signed and Sealed this

Thirty-first Day of July, 2007

JON W. DUDAS
*Director of the United States Patent and Trademark Office*